UNITED STATES PATENT OFFICE.

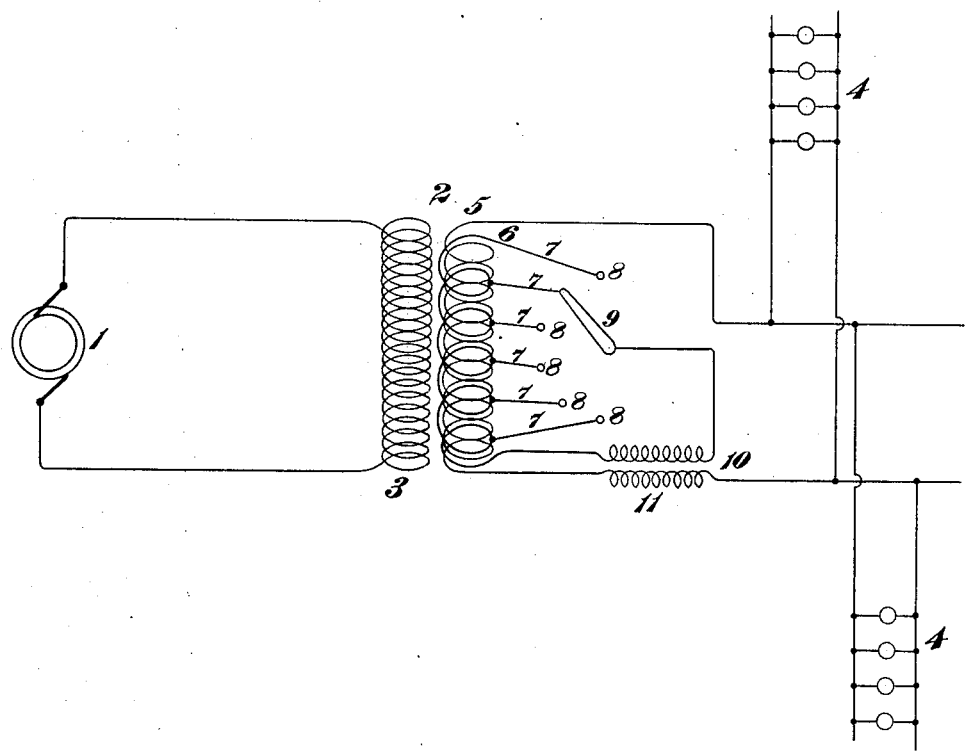

BENJAMIN G. LAMME, OF PITTSBURG, PENNSYLVANIA, ASSIGNOR TO THE WESTINGHOUSE ELECTRIC AND MANUFACTURING COMPANY, OF PENNSYLVANIA.

SYSTEM OF ELECTRICAL DISTRIBUTION.

SPECIFICATION forming part of Letters Patent No. 633,855, dated September 26, 1899.

Application filed January 30, 1899. Serial No. 703,791. (No model.)

*To all whom it may concern:*

Be it known that I, BENJAMIN G. LAMME, a citizen of the United States, residing in Pittsburg, in the county of Allegheny and State of Pennsylvania, have invented a new and useful Improvement in Systems of Electrical Distribution, (Case No. 804,) of which the following is a specification.

My invention relates to the distribution of electrical energy, and has particular reference to means for varying the alternating-current electromotive force supplied to translating devices.

The object of my invention is to provide a simple and efficient means for varying the electromotive forces supplied to translating devices from the secondaries of stationary transformers without varying the active length of either of the main windings of such transformers or the normal inductive relation of such windings.

In the transformation from a very high to a very low voltage by means of stationary transformers the volume of secondary current is so great as to render the switching from one lead to another for the purpose of varying the active length of the secondary impracticable, and the primary electromotive force is so high that the length of the primary winding cannot be varied either economically or safely. It is, of course, equally difficult to vary secondary electromotive forces by varying the active length of either of the windings of step-up transformers or those having a one-to-one ratio of transformation; but the necessity for electromotive-force regulation in such cases does not often arise.

My invention is intended for use in connection with any and all types of stationary transformers wherever it is desired to vary the secondary electromotive force.

In the accompanying drawing I have shown a diagram of a system of distribution comprising an alternating-current generator 1, a step-down stationary transformer 2, the primary 3 of which is in circuit with said generator 1, and translating devices 4, supplied with current from the main secondary winding 5 of the transformer 2.

In order to vary the electromotive force supplied to the translating devices, as is often found necessary in practice, I provide an auxiliary secondary winding 6, from which leads 7 are carried out to contact-pieces 8. One terminal of the auxiliary secondary winding 6 is connected to a switch-arm 9, arranged to make contact with any one of the stationary contact-pieces 8 in order to vary the active length of the secondary winding 6. This winding 6 is so proportioned as to have generated therein a comparatively small current and low electromotive force, such as will not interfere with the operation of the switching devices 8 9. In order that the variation of the electromotive force of this auxiliary secondary coil may be imparted to the circuit supplying the translating devices, I provide a series transformer 10, one winding 11 of which is in circuit with the main secondary 5 of the transformer 2, and the other winding in series with the auxiliary secondary winding 6 or with such portion of the same as may be in circuit through the switching devices 8 9. When the windings of the series transformer 10 are arranged and connected in circuit as indicated in the drawing, any increase in the active length of the secondary winding 6 beyond a zero value will correspondingly reduce the electromotive force in the main secondary circuit. It is to be understood that a reversal of the terminals of either winding of the transformer 10 will serve to make the action of the secondary 6 that of a booster with reference to the electromotive force of the main secondary circuit and that my invention is intended to cover both arrangements and methods of operation. It will be readily seen that with this arrangement of apparatus the auxiliary secondary winding may be designed and proportioned to have a range equal to the maximum variation in the secondary electromotive force desired, and as this is ordinarily only a comparatively small percentage of the entire secondary electromotive force the regulation may be readily effected without injury to the switching devices employed.

I have for convenience shown the invention as applied to a single-phase circuit; but it will be understood that it is equally applicable to circuits of two or more phases, and it will also be understood that the translating devices supplied with current from the transformer 2 may be of any known type or kind and connected in circuit in any well-known manner.

I claim as my invention—

1. In a system of electrical distribution, the combination with an alternating-current generator, of translating devices, a transformer having a primary winding in circuit with said generator, a main secondary winding in circuit with said translating devices, an auxiliary secondary winding closed upon itself through a coil which is in inductive relation to a portion of the circuit supplying the translating devices and means for varying the active length of said auxiliary secondary winding.

2. In a system of electrical distribution, the combination with a source of alternating currents, of translating devices, a transformer having a primary winding in circuit with the source of currents, a secondary winding in circuit with the translating devices and a winding closed upon itself and provided with means for varying its active length, and a second transformer having one of its windings in said closed circuit and its other winding in circuit with the non-variable secondary of the main transformer.

3. In a system of electrical distribution, a main transformer having an auxiliary secondary winding, a supplemental transformer having its windings respectively in series with the main and auxiliary windings of the main transformer and means for varying the active length of said auxiliary winding, all combined substantially as shown and described.

In testimony whereof I have hereunto subscribed my name this 27th day of January, 1899.

BENJ. G. LAMME.

Witnesses:
WESLEY G. CARK,
H. C. TENER.